US011245469B2

United States Patent
Lakshmanan et al.

(10) Patent No.: US 11,245,469 B2
(45) Date of Patent: Feb. 8, 2022

(54) LINE-OF-SIGHT OPTICAL COMMUNICATION FOR VEHICLE-TO-VEHICLE (V2V) AND VEHICLE-TO-INFRASTRUCTURE (V2I) MOBILE COMMUNICATION NETWORKS

(71) Applicant: The Regents of the University of Michigan, Ann Arbor, MI (US)

(72) Inventors: Sridhar Lakshmanan, Belleville, MI (US); Paul Richardson, Beverly Hills, MI (US); Ya Sha Yi, Troy, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 16/634,527

(22) PCT Filed: Jul. 26, 2018

(86) PCT No.: PCT/US2018/043947
§ 371 (c)(1),
(2) Date: Jan. 27, 2020

(87) PCT Pub. No.: WO2019/023491
PCT Pub. Date: Jan. 31, 2019

(65) Prior Publication Data
US 2020/0177276 A1 Jun. 4, 2020

Related U.S. Application Data

(60) Provisional application No. 62/537,525, filed on Jul. 27, 2017.

(51) Int. Cl.
*H04B 10/00* (2013.01)
*H04B 10/112* (2013.01)
(Continued)

(52) U.S. Cl.
CPC ........ *H04B 10/112* (2013.01); *H04B 1/3822* (2013.01); *H04B 10/1143* (2013.01);
(Continued)

(58) Field of Classification Search
CPC ............................ H04B 10/112; H04B 1/3822
See application file for complete search history.

(56) References Cited

U.S. PATENT DOCUMENTS

2004/0208632 A1* 10/2004 Dietz .................. G09G 3/3406
398/182
2005/0129410 A1 6/2005 Wilsey et al.
(Continued)

FOREIGN PATENT DOCUMENTS

CN 104539738 A 4/2015
CN 105378816 A 3/2016
(Continued)

OTHER PUBLICATIONS

C. Liu et al., "Enabling Vehicular Visible Light Communication (V2LC) Networks", VANET '11 Proceedings of the Eighth ACM international workshop on Vehicular inter-networking, dated Sep. 23, 2011, pp. 41-50.
(Continued)

*Primary Examiner* — David C Payne
*Assistant Examiner* — Pranesh K Barua
(74) *Attorney, Agent, or Firm* — Reising Ethington P.C.

(57) ABSTRACT

A vehicle line-of-sight optical communication system and method for use in ad hoc networks formed with a vehicle during traveling of the vehicle along a roadway. The communication system includes: an electronic control unit (ECU) having an electronic processor that operates under control of a program to process messages sent or received by the communication system; at least one light source that comprises a part of a vehicle external lamp module; a driver
(Continued)

circuit electrically connected to the ECU to energize the light source(s) in response to a transmission signal from the ECU so as to send messages via the light source(s); at least one light sensor that comprises a part of the vehicle external lighting system; and a receiver circuit electrically connected to the ECU to provide the ECU with a reception signal indicative of messages received via the light sensor(s).

11 Claims, 5 Drawing Sheets

(51) Int. Cl.
*H04B 1/3822* (2015.01)
*H04B 10/114* (2013.01)
*H04L 12/40* (2006.01)

(52) U.S. Cl.
CPC ............ *H04L 12/40006* (2013.01); *H04L 2012/40273* (2013.01)

(56) References Cited

U.S. PATENT DOCUMENTS

| | | | |
|---|---|---|---|
| 2006/0119489 A1* | 6/2006 | Shinada | G08G 1/164 340/901 |
| 2009/0072996 A1* | 3/2009 | Schoepp | B60Q 1/50 340/903 |
| 2010/0074622 A1* | 3/2010 | Damink | H04B 10/1149 398/78 |
| 2012/0268958 A1* | 10/2012 | Kasaba | B60Q 1/10 362/466 |
| 2013/0261872 A1* | 10/2013 | Ferguson | G05D 1/0088 701/28 |
| 2013/0343768 A1 | 12/2013 | Jang et al. | |
| 2015/0023668 A1* | 1/2015 | Spaulding | H04B 10/1129 398/106 |
| 2015/0063818 A1* | 3/2015 | Zhou | H04L 25/0305 398/115 |
| 2015/0244459 A1* | 8/2015 | Lindsay | G08G 1/096791 398/130 |
| 2015/0353008 A1* | 12/2015 | Kline | G08G 1/162 340/993 |
| 2017/0024938 A1* | 1/2017 | Lindsay | B60W 40/10 |
| 2017/0129393 A1 | 5/2017 | Johnson et al. | |
| 2017/0186327 A1* | 6/2017 | Uysal | B60Q 1/00 |
| 2017/0213461 A1* | 7/2017 | Murray | G08G 1/096791 |
| 2017/0302374 A1* | 10/2017 | Shatz | H04B 10/60 |
| 2018/0065644 A1* | 3/2018 | Kim | G08G 1/161 |
| 2018/0196139 A1* | 7/2018 | Brown | G01S 17/89 |
| 2018/0205457 A1* | 7/2018 | Scheim | H04B 10/40 |
| 2018/0359031 A1* | 12/2018 | Raynor | G06T 7/70 |
| 2019/0182929 A1* | 6/2019 | Nishijima | G05B 19/042 |
| 2019/0188503 A1* | 6/2019 | Orris, Jr. | G06K 9/00825 |
| 2020/0021368 A1* | 1/2020 | De-Lamberterie | H04B 10/116 |
| 2020/0057160 A1* | 2/2020 | Li | G01S 7/4808 |

FOREIGN PATENT DOCUMENTS

| | | |
|---|---|---|
| JP | H05266399 A | 10/1993 |
| KR | 20090051020 A | 5/2009 |
| KR | 100908916 B1 | 7/2009 |
| KR | 20100049488 A | 5/2010 |
| KR | 20150012479 A | 2/2015 |

OTHER PUBLICATIONS

International Search Report corresponding to International Application No. PCT/US2018/043947, dated Nov. 8, 2018, 3 pages.
Written Opinion corresponding to International Application No. PCT/US2018/043947, dated Nov. 8, 2018, 5 pages.

\* cited by examiner

Typical LED Characteristics

| Semiconductor Material | Wavelength | Colour | $V_F$ @ 20mA |
|---|---|---|---|
| GaAs | 850-940nm | Infra-Red | 1.2v |
| GaAsP | 630-660nm | Red | 1.8v |
| GaAsP | 605-620nm | Amber | 2.0v |
| GaAsP:N | 585-595nm | Yellow | 2.2v |
| AlGaP | 550-570nm | Green | 3.5v |
| SiC | 430-505nm | Blue | 3.6v |
| GaInN | 450nm | White | 4.0v |

LINE-OF-SIGHT OPTICAL COMMUNICATION FOR VEHICLE-TO-VEHICLE (V2V) AND VEHICLE-TO-INFRASTRUCTURE (V2I) MOBILE COMMUNICATION NETWORKS

TECHNICAL FIELD

The present invention relates to vehicle-to-vehicle and vehicle-to-infrastructure mobile communication networks.

BACKGROUND

Vehicle-to-vehicle (v2v) networks provide the capability to significantly reduce vehicular collisions by allowing vehicles to exchange messages with other vehicles, such as 'changing lanes', 'braking hard', 'ice patch', etc. Active and passive sensor-based vehicle object detection systems that do not involve v2v communication rely on the interpretation of signals to determine the behavior of nearby vehicles and other objects). The signals could be corrupt or jammed leading to wrong interpretation. Sensors can also fail leading to lost capability. A v2v network, on the other hand, relies on explicit information exchanged between vehicles in the form of data packets. These packets, if received without error, provide precise unambiguous information about the current status (e.g., position, speed, and heading) and intention (e.g., changing lanes, braking hard, making right turn, etc.) from nearby vehicles. This information may be fused with information from existing sensors (cameras, radars, lidars, etc.) to improve driving.

In realistic traffic scenarios (e.g., major roadways with heavy traffic) the number of vehicles, the speeds at which they are moving, and the continually changing position and heading relative to each other makes a low latency, reliable, v2v network very challenging.

v2v networks that rely on RE communications, such as those using dedicated short range communication (DSRC), are widely envisioned to address this issue. However, these RF networks have inherent disadvantages due to the propagation characteristic of RF signals. The RF signals tend to propagate in patterns that are omnidirectional and in a plane. The result is that many more vehicles than those desired would receive an RF signal transmitted from a host vehicle. Thus a network architecture based on DSRC may require additional processing and hardware overhead to determine which vehicles form a subnet, manage the orthogonal channel assignments (e.g., time, frequency, coding, and space) to those subnets, and then route packets between the vehicles in the subnet. Moreover, due to the continually changing position and orientation of vehicles relative to each other, these network must be capable of performing these tasks very quickly.

The conventional paradigms of network management, such as network admission and route discovery, may breakdown because vehicle subnets are constantly evolving as vehicles change relative position. In a heavy traffic scenario (e.g. major roadway at rush hour), it may be difficult to manage channel assignments and mobile networking.

SUMMARY

In accordance with an aspect of the invention, there is provided a vehicle line-of-sight optical communication system for use in ad hoc networks formed with a vehicle during traveling of the vehicle along a roadway. The communication system includes: an electronic control unit (ECU) having an electronic processor that operates under control of a program to process messages sent or received by the communication system; at least one light source that comprises a part of a vehicle external lamp module; a driver circuit electrically connected to the ECU to energize the light source(s) in response to a transmission signal from the ECU so as to send messages via the light source(s); at least one light sensor that comprises a part of the vehicle external lighting system; and a receiver circuit electrically connected to the ECU to provide the ECU with a reception signal indicative of messages received via the light sensor(s).

In various embodiments, the communication system may include any one or more of the following features in any technically-feasible combination:

- the communication system includes the vehicle external lamp module, wherein the lamp module includes the light source(s), light sensor(s), ECU, driver circuit, and receiver circuit, and further includes a power input for receiving power from the vehicle.
- the communication system includes a housing, a cover lens attached to the housing, and additional light sources mounted with the at least one light source in the housing for shining light produced from the light sources through the cover lens.
- the communication system includes a vehicle bus interface electrically connected to the ECU and operable to control the sending and receipt of bus messages between the ECU and a vehicle communication bus.
- the ECU and vehicle bus interface are integrated together into a single module or are physically separate modules electrically wired to each other.
- the at least one light source and at least one light sensor together comprise a single light emitting diode (LED), with the driver circuit and receiver circuit both being electrically connected to the LED and forming with the LED an optical transceiver.
- the at least one light source comprises at least one light emitting diode (LED), the at least one light sensor comprises at least one phototransistor, and the driver and receiver circuits comprise separate circuits electrically connected to the LED(s) and phototransistor(s), respectively.
- the ECU comprises a processor, computer readable memory, and a program stored in the memory and accessible by the processor, wherein the processor is operable under control of the program to establish a node on an ad hoc network with other vehicles and to control the communicating of messages with other vehicles using the light source(s) and light sensor(s).
- the processor and memory are contained on a single integrated circuit.
- the communication system comprises a plurality of vehicle external lamp modules installed on a vehicle, each of which includes the ECU, light source(s), driver circuit, light sensor(s), and receiver circuit.

In accordance with another aspect of the invention, there is provided a method of communicating over an ad hoc network from a vehicle traveling along a roadway. The method includes the steps of: establishing communication from a vehicle with a plurality of other Vehicles using line-of-sight optical signals, wherein the optical signals are sent and received via one or more external lamp modules on the vehicle that provide visual signaling and/or illumination external to the vehicle; and transmitting messages using the line-of-sight optical signals between the vehicle and the other vehicles. The method may use the optical communication system defined above in any of its various forms.

BRIEF DESCRIPTION OF THE DRAWINGS

Illustrative embodiments will hereinafter be described in conjunction with the appended drawings, wherein.

DETAILED DESCRIPTION

Improved v2v and v2i communication may be achieved using vehicles equipped with a line-of-sight optical communication system that enables the formation of ad hoc networks with adjacent vehicles and/or road-side equipment (RSE) for the sharing of safety messages during operation of the vehicles on the roadway. Accordingly, aspects of the invention include:

- a line-of-sight optical-based communication system for use on a vehicle to form and participate in the ad hoc networks;
- individual vehicle external lamp modules that are used together on an individual vehicle to implement the optical-based communication system;
- vehicles equipped with the optical-based communication system;
- methods used to form and participate in the ad hoc networks using the optical-based communication; and
- road-side equipment that includes similar optical-based communication systems to enable v2i communication, and that may include cellular and/or other wireless communication capability fix connecting the ad hoc networks to municipal or other wide area networks.

In at least some embodiments, the line-of-sight optical communication system disclosed herein improves the sharing of basic safety messages and/or other data between vehicles by establishing ad hoc networks with adjacent vehicles and/or RSE using optical communication built into the external lamp modules provided on the vehicle for such things as forward illumination (headlamps), rear signaling lights (tail lights, brake lights, etc.), and marker lights which are often distributed on the sides of vehicles. The communication system may be designed to address the following constraints for use with vehicular travel on roadways:

low latency of the ad hoc network communication on the order of fractions of a second;

vehicles closest to each other benefit the most from the exchange of safety messages as opposed to vehicles a hundred or more of meters away, and vehicles moving on a roadway will constantly change their position and orientation relative to each other.

The first two of these constraints may be addressed at least in part by providing subnets consisting of a small number of adjacent vehicles to keep the latency low. A large number of networked vehicles would incur much larger delays due to the increased message traffic and need for large overhead to manage a large network. The last of these constraints indicates that the network management must quickly assign (and sever) node connections and manage routes between vehicles in order to ensure the correct subset of vehicles are able to exchange safety messages.

Figure 1:
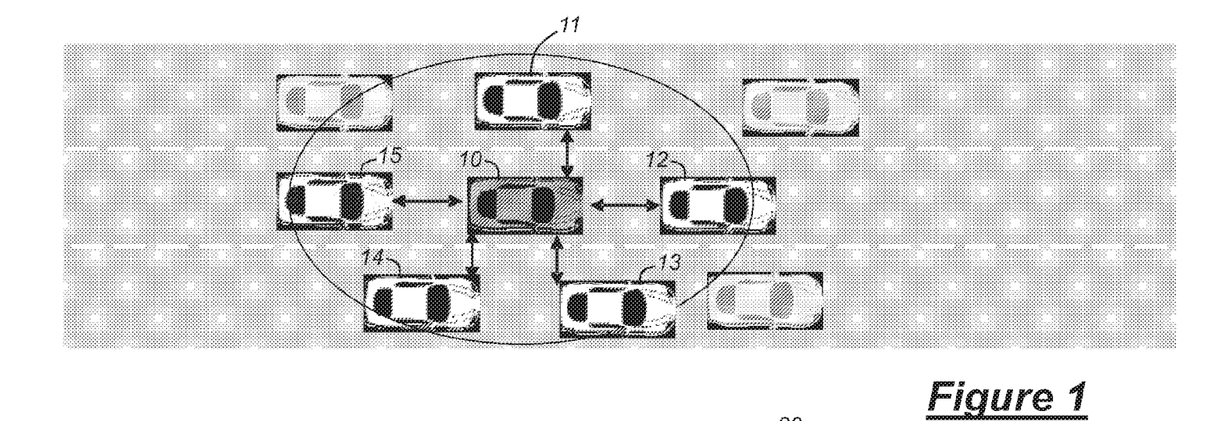
FIG. 1 is a diagram of an ad hoc vehicle network formed from a plurality of vehicles using line-of-sight optical communication systems installed on the vehicles.

To address these constraints, a network approach is used that relies on line-of-sight optical communication to form an ad hoc vehicle network among adjacent vehicles as they traverse the roadway. The network may be referred to as an implicit network. An example is shown in FIG. 1 wherein each of the vehicles shown is equipped with a similar or identical line-of-sight optical communication system that enables at least one of the vehicles to operate as a host (indicated by the central vehicle 10 in FIG. 1) that communicates with each of a number of end nodes (on the adjacent vehicles 11-15 in FIG. 1) as indicated by the arrows. In some embodiments, one or more or all of the vehicles may be equipped with a line-of-sight optical communication system that allows it to operate as a host through which communications between other adjacent vehicles may pass. In other embodiments, the vehicles may instead establish a peer-to-peer network without using any particular vehicle as a host or central node for the subnet.

By using line-of-sight optical communication, the system relies on signaling abilities built into the external lamp modules on each vehicle. These modules are commonly implemented using light emitting diodes (LEDs) which are suitable for sight data communication. As will be discussed below, the external lamp modules distributed around the vehicle will include additional circuitry that will make them capable of sending and receiving safely relevant messages. Subnetworks that will exchange data consist of vehicles that are sufficiently adjacent to one another that line-of-sight optical communication may be carried out. By "optical" is meant not only visible light, but also light invisible to the human eye that has a wavelength suitable for use in line-of-sight communication, including at least portions of the infrared (IR), visible, and ultraviolet (UV) light spectrums. Using the circuitry described below, the LED lighting in the headlights, tail lights, and turn signals can be constantly transmitting control packets in an attempt to establish communications with an adjacent vehicle, including any identification, authentication, or handshaking needed or desirable to set up the ad hoc network. When two vehicles are adjacent to one another (side, front, or back) they exchange packets and form a subnetwork that allows the transmission of low latency safety messages. Thus, each vehicle may implicitly form a subnet with any and all vehicles that are adjacent to it. If the vehicles move away from each other, either by too great a distance for the optical communication or out of each other's line of sight, the network is implicitly reformed using any other adjacent vehicles. The adjacent vehicle subnetworks form and reform as quickly as the vehicles become adjacent to each other then move away. Without the need to manage channel assignments and without the large numbers of vehicles as occurs in RF-based solutions, the optical-based ad hoc networks need not have any network overhead and associated delays with forming subnets. These and other advantages will be evident upon consideration of the example embodiments discussed below.

Figure 2:
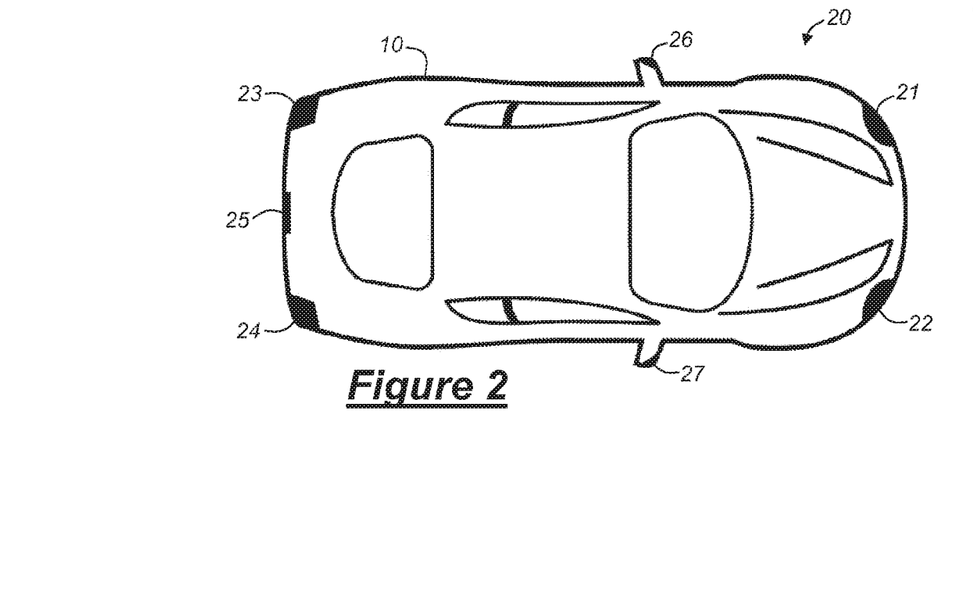
FIG. 2 depicts a vehicle from FIG. 1 that includes an embodiment of a line-of-sight optical communication system constructed in accordance with the invention

Referring now to FIG. 2, there is shown a vehicle 10 in the form of a passenger car that includes an embodiment of a line-of-sight optical communication system 20 that utilizes a plurality of vehicle external lamp modules 21-27 which permit the vehicle 10 to establish the ad hoc network with adjacent vehicles located in front, behind, and on each side of the vehicle. More or less such lamp modules may be used. In the illustrated embodiments, this communication system is implemented using lamp modules that additionally perform signaling and external illumination for conventional purposes, but it will be appreciated that in other embodiments, the optical communication system can be implemented on the vehicle using dedicated light sources and sensors that are not part of the standard illumination and signaling light modules.

As indicated, the vehicle includes left and right forward illumination modules 21, 22, each of which is a vehicle external lamp module providing forward illumination, turn signaling, and marker lights. In other embodiments, some or all of these different function lights from the front corner modules 21, 22 may be separately provided on the vehicle 10 rather than in the illustrated integrated modules. The vehicle 10 further includes rear lighting, including left and right brake light and turn signal modules 23, 24 and a center high mounted stop lamp (CHMSL) 25. The sides of the vehicle further include a pair of side signaling/marker light modules 26, 27, one mounted on each side view mirror of the vehicle.

Figure 3:
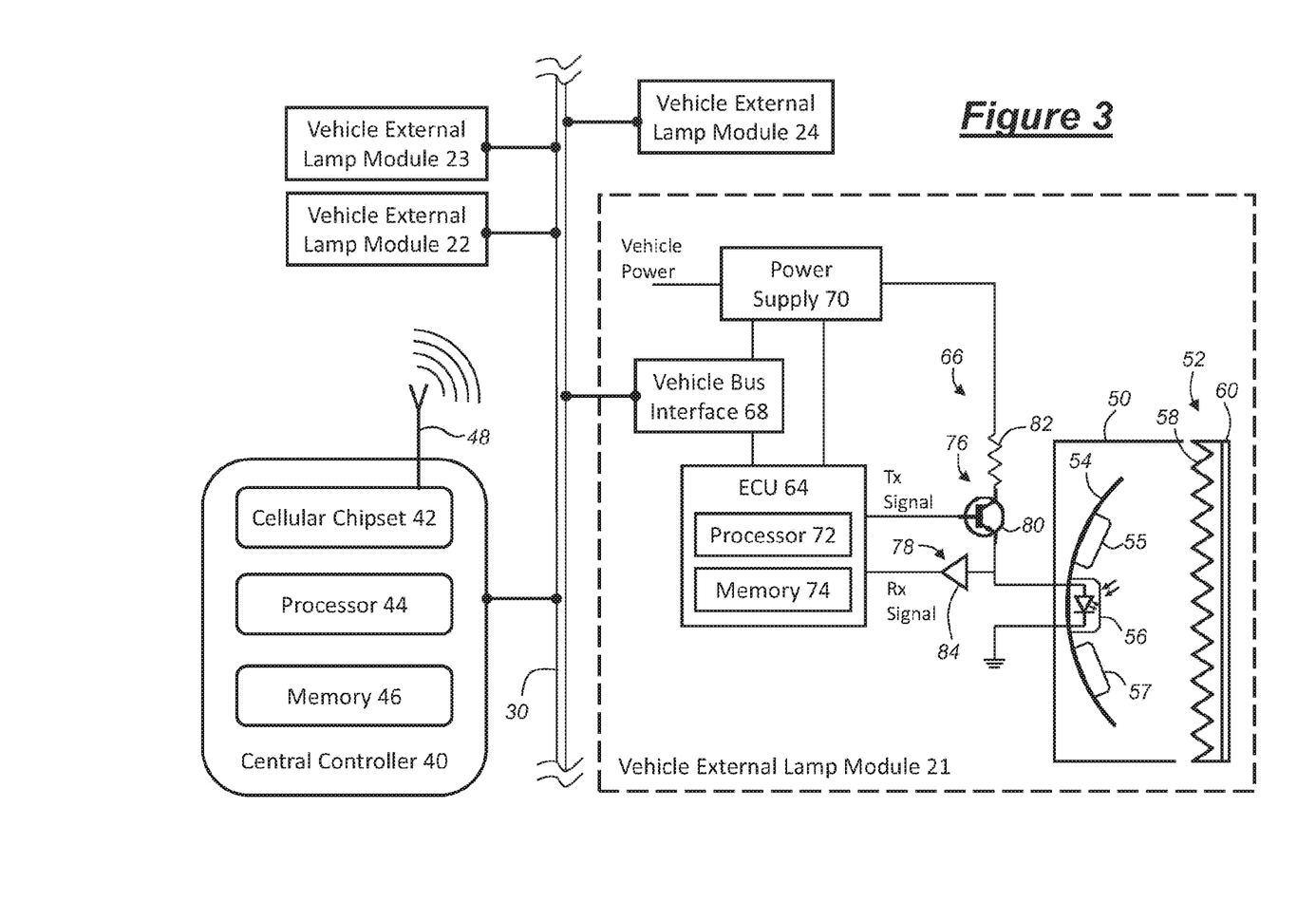
FIG. 3 depicts the line-of-sight optic communication system of FIG. 2.

FIG. 3 depicts an embodiment of a line-of-sight optical communication system 20 such as is used on the vehicles 10-15 of FIGS. 1 and 2. The communication system 20 includes a number of vehicle external lamp modules, four of which are shown and may be, for example, the four front and rear corner lamp modules 21-24 shown in FIG. 2. The circuitry used to help implement the optical communication system 20 is shown only for module 21, and the remaining modules 22-24 may have the same or similar circuitry. These modules 21-24 are interconnected to each other via a vehicle communication bus 30, although other implementations are possible, including RF wireless communication between modules or direct wiring that does not involve a central bus. The communication system 20 optionally has a central controller 40 as shown, which may be in communication with the lamp modules 21-24 such as via the vehicle communication bus 30. The central controller 40 may be used to control internal and/or external communication of messages via the lamp modules 21-24, including the programming used to establish and manage communication with other vehicles on the ad hoc network either as a host node or end node.

The illustrated vehicle external lamp module 21 is shown diagrammatically in FIG. 3 and includes what can be a conventional set of light sources and optics to provide illumination and/or visual signaling externally of the vehicle. Thus, it includes a housing 50 having a cover lens 52 and internal reflector 54 or other mounting substrate for one or more light sources (three such light sources 55-57 being shown). The cover lens 52 may include optical elements 58 that, along with reflector 54, determine the light distribution (beam pattern) of light emanating from the lamp module. The cover lens may further include an optical filter 60 which, as will be described below, may be used for various purposes, such as to polarize or restrict the wavelengths of incoming light to thereby improve the optical communication of data using the system 20.

The lamp module 21 further includes circuitry that is used in implementing the optical communication system 20. This includes an electronic control unit (ECU) 64, a transceiver circuit 66, a vehicle bus interface 68, and a power supply 70 which may be optionally provided where the desired supply voltages are not provided directly from the vehicle. The vehicle bus interface 68 is used to send and receive messages over the vehicle bus 30 and may use standard protocols such as a controller area network (CAN), a media oriented system transfer (MOST), a local interconnection network (UN), a local area network (LAN), or any other appropriate connections such as Ethernet or others that conform with known ISO, SAE and IEEE standards and specifications, to name but a few. Suitable circuit designs and implementations for the vehicle bus interface will be apparent to those skilled in the art.

ECU 64 may be implemented using known hardware circuits and includes primarily an electronic processor 72 and a non-transitory computer readable medium 74 that stores a program which is accessible and executable by the processor 72 to cause the processor to establish a node on an ad hoc network with other vehicles and to control the communicating of messages with other vehicles using the lamp module 21. The processor 72 may be any type of device capable of processing electronic instructions including microprocessors, microcontrollers, host processors, controllers, vehicle communication processors, and application specific integrated circuits (ASICs). Processor 72 executes various types of digitally-stored instructions, such as software or firmware programs stored in memory 74, which enable the ECU 64 to carry out its functions. Memory 74 may by RAM, other temporary powered memory, any non-transitory computer-readable medium (e.g., NVRAM or EEPROM), or any other electronic computer medium that stores some or all of the software needed to carry out the various external device functions discussed herein. Processor 72 and memory 74 may either be separate physical components or contained together on a single integrated circuit.

ECU 64 and vehicle bus interface 68 may be integrated into a single physical device or module, or may be separate components. Also, ECU 64 and vehicle bus interface 68 may be a part of the vehicle external lamp module 21 as shown, or can be separate components that connect to the lamp module.

Transceiver circuit 66 comprises an integrated driver circuit 76 and receiver circuit 78 and is used to both drive the light source 56 and receive a signal from the light source 56 indicative of received light. When implemented using an LED 56 as shown, this circuit arrangement permits both sending and receiving of messages using optical communication from a single LED. The transmission and reception of messages may be slotted, or interleaved by using the driver circuit to multiplex between sending and reception. In particular, the driver circuit 76 may include a transistor switch 80 and current limiting resistor 82 that connects a supply of power to the LED such that, when activated by ECU 64, the transistor energizes the LED 56 and, when not activated, the transistor isolates the node at its emitter such that light received by the LED may be sensed by the receiver circuit connected to the isolated emitter node and provided to the ECU as shown.

To transmit messages, the LED 56 may be modulated (pulsed) by the ECU 64 using a transmission signal that is modulated according to the message to be transmitted. In this way, the LED is effective to optically communicate the message from the vehicle. Various encoding techniques may be used, such as time, frequency or digital encoding; for example, using frequency shift keying (FSK) to digitally transmit the messages as binary data. The message may be sent in data packets, with error checking, encryption, and other data messaging techniques used as needed or desirable for a particular application. Furthermore, if the external lamp module is further modified to incorporate more advanced digital communication techniques then more information can be transmitted more reliably within the v2v ad hoc adjacency network.

The receiver circuit 78 may include a high input impedance buffer 84 that provides a reception signal inputted into ECU 64 whereby it may receive messages from the other vehicles 11-15.

Figure 4:
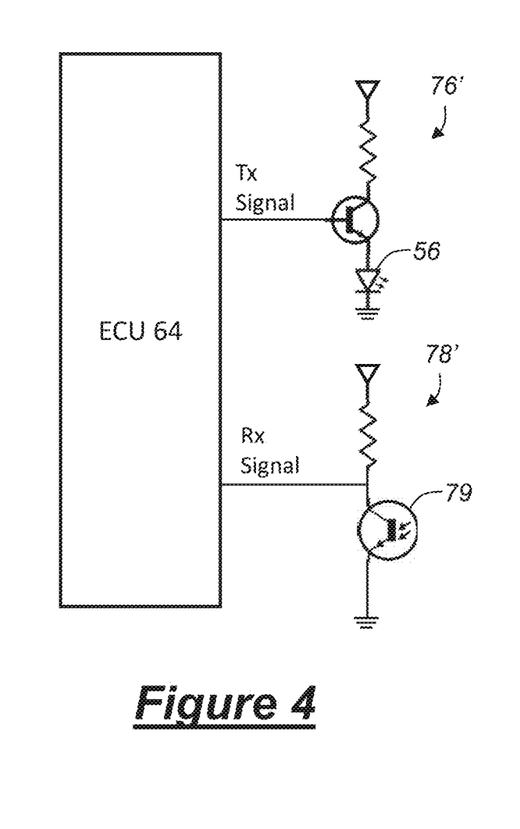
FIG. 4 is a schematic of a portion of an alternative embodiment of the circuitry of FIG. 3 that utilizes separate driver and receiver circuits.

In lieu of the integrated transceiver circuit 66 of FIG. 3, the driver and receiver circuits may be implemented as separate circuits, such as is shown in FIG. 4. In this implementation, optical transmission by LED 56 is carried out using a dedicated driver circuit 76' and optical message reception is carried out using a dedicated receiver circuit 78' that includes a phototransistor 79 which provides ECU 64 with a HIGH (Vcc) input in the absence of received light, and a LOW (ground) input when light strikes the phototransistor 79. In this implementation, the phototransistor 79 may be included in the housing 50 adjacent the LED 56.

Figure 5:
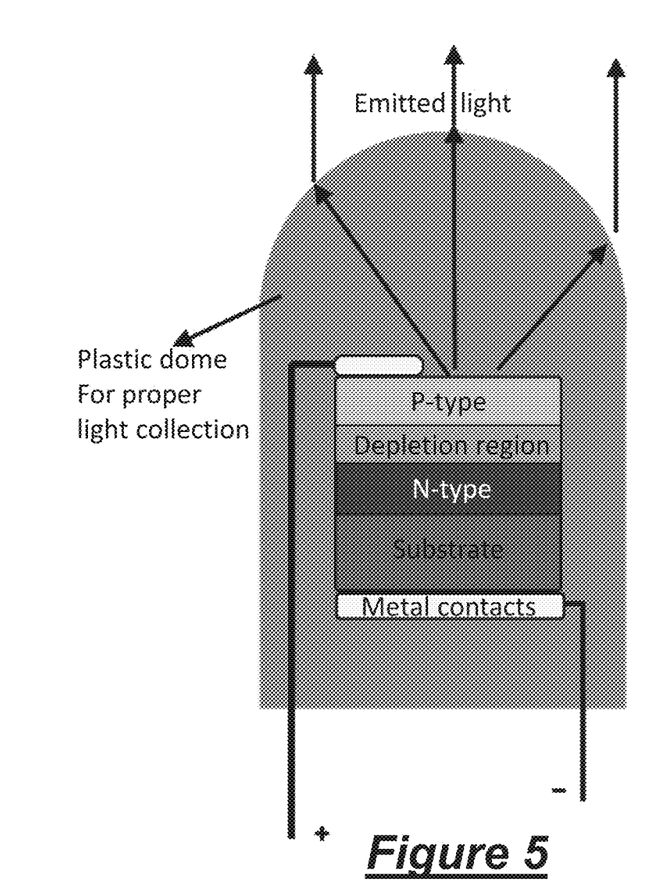
FIG. 5 is a diagram of a light emitting diode (LED) suitable for use in the optical communication system of FIG. 3.
Figure 6:
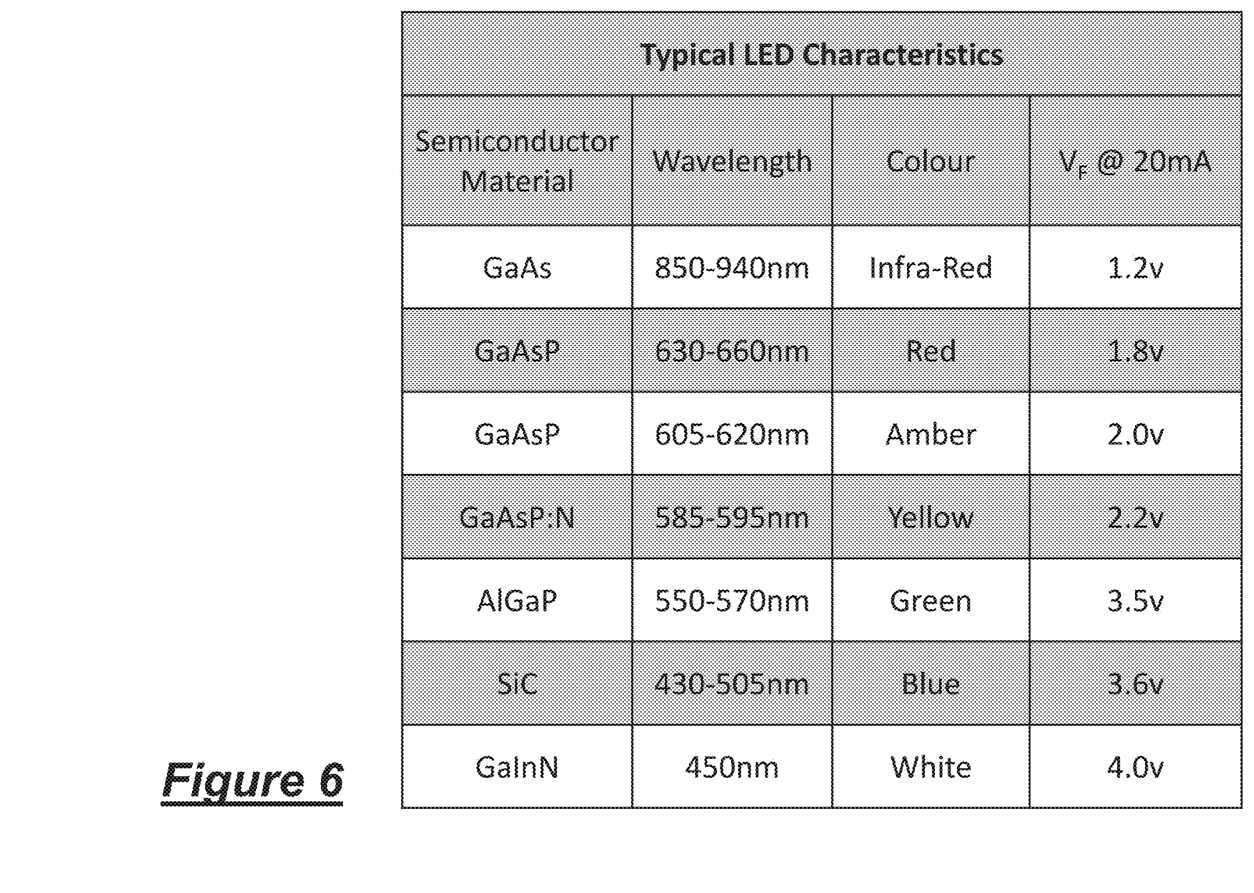
FIG. 6 depicts the wavelength sensitivity for various types of semiconducting materials that may be used as the LED of FIG. 5.

Referring now to FIG. 5, there is shown a diagram of an LED 56 of the type which may be used in vehicle exterior lighting. The diagram shows the typical device structure of semiconductor layers and contacts. Although other types of light sources may be used, LEDs possess two properties that make them useful for the communication system 20. They are inherently short range and do not propagate their light though another vehicle or other obstacles. They can easily be tuned to invisible spectrum so that visible lighting sources will not interfere with data transmissions. FIG. 6 depicts the wavelength sensitivity for various types of semiconducting materials that may be used for LED 56.

In some embodiments, both visible and invisible wavelength LEDs may be embedded in the vehicle external lamp modules. The use of invisible LEDs (e.g., those operating at wavelengths longer than what humans can see) may help render the v2v adjacency network substantially noise and interference free since other vehicle exterior lighting not used for the network (e.g., headlights for frontal illumination or intermittent brake lights or blinking turn signals) will not interfere with the reception of the invisible optical communication. In other embodiments, by altering the individual lenses of the LEDs that comprise the external lamp module, a variety of optical techniques can be realized to gain a clear advantage. For example, by appropriately polarizing the lens 52 (e.g., by using a polarizer for optical filter 60), the transmitted/received light can be made to overcome network noise coming from direct sunlight or specular light reflections such as glass, mirrors, puddles, etc.

Referring back to FIG. 3, the central controller 40 may be used in some embodiments to process data received from the different external lamp modules 21-24. For that purpose, controller 40 includes an electronic processor 44 and memory 46 which may be implemented the same as discussed above for processor 72 and 74 of ECU 64. Controller 40 may further include cellular communication capability, such as by including a cellular chipset 42 and antenna 48 that permits data communication via a wireless carrier system. In this regard, controller 64 may be a telematics unit installed on the vehicle that forms a part of communication system 20 while also performing other vehicle and telecommunications functions. The construction and use of such telematics units for vehicles is known to those skilled in the art.

The central controller 40 may also be in communication with other vehicle systems over the communication bus 30; for example, to a vehicle collision avoidance system for automatic braking or to provide a driver or occupant warning. Thus, using central controller 40, data received from other vehicles may be processed by the controller for various purposes. For example, information received from adjacent vehicles may be aggregated at the host vehicle 10 to form a sparse point cloud—much like a low-resolution LIDAR sensor mounted on the host vehicle. The host vehicle can then make a number of intelligent decisions based on this point cloud; for example, the host vehicle can change its trajectory of motion to avoid a collision.

Figure 7:
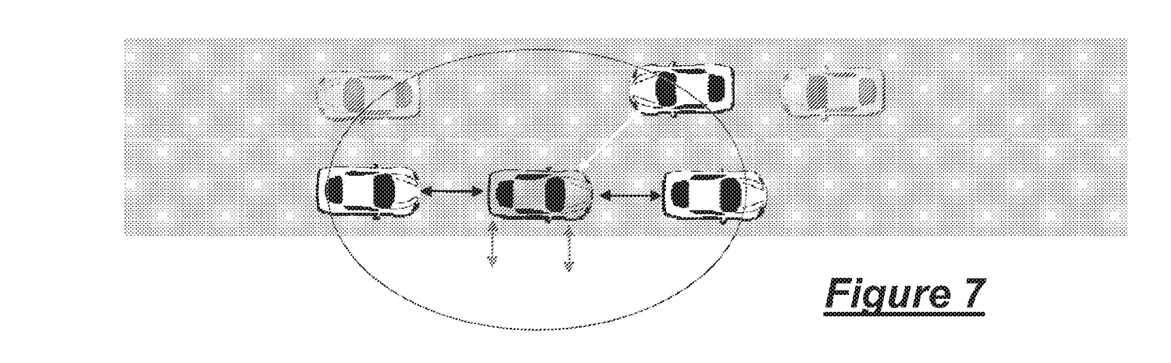
FIG. 7 depicts a situational example involving oncoming traffic and use of the optical communication system to avoid a collision.

Turning now to FIG. 7, there is shown a situational example involving oncoming traffic for which the optical communication system may be used to help avoid a head-on collision. For a two-lane road with two-way traffic, and assuming vehicle speeds of 60 mph in each direction (about 25 meters/sec), there results a relative velocity of about 50 meters/sec which is about 1 meter of closing distance every 20 milliseconds. If the system runs with a 100 Hz update rate and the approaching vehicle is detected at 50 meters in front giving about 1 second of avoidance time, the system will be able to generate 100 updates before the potential collision would occur.

Figure 8:
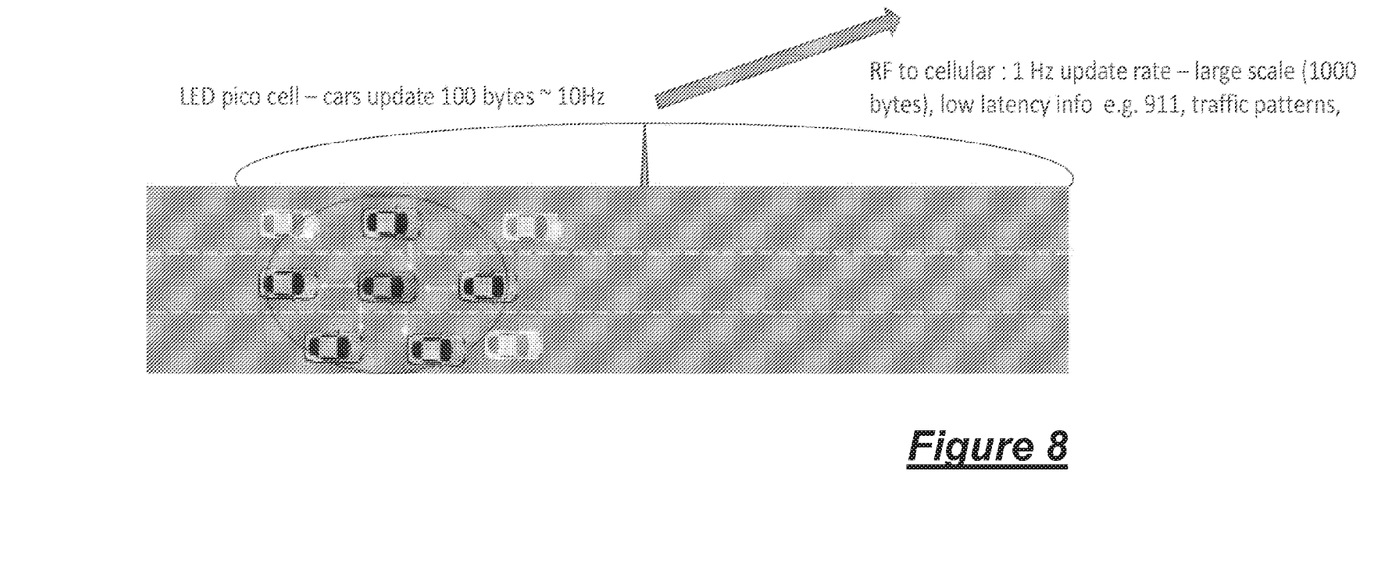
FIG. 8 depicts the use of road side equipment (RSE) to provide additional functionality using the optical communication system of FIG. 3.

FIG. 8 depicts the use of road side equipment (RSE) to expand the capabilities of the system. The circuitry and techniques described above for v2v optical communication may be used for v2i. The primary difference is that the infrastructure node enters the system as an immobile transceiver. Given that LEDs are widely used for street lighting, traffic lighting, pedestrian crossing, etc., the infrastructure node may be seamlessly integrated into these public lighting systems, very similar to how it is architected in the vehicle external lamp modules described above. The use of immobile infrastructure nodes adds additional layers of intelligence to the network:

- These nodes can be used to localize the position of host vehicle much more accurately using enhanced UPS techniques like differential GPS.
- These nodes can be made to relay non line-of-sight information to the host vehicle—such as the position of another (occluded) vehicle approaching the same intersection as the host vehicle.
- These nodes can be used to relay downstream traffic, weather, of emergency information.
- These nodes could also form the backbone of a wider area network ala 4G/5G cellular networks.

In addition to passenger car versions of system, the optical communication system 20 may also be implemented on emergency response vehicles to provide additional functionality for:

- v2i systems that control traffic lights; and
- v2v systems that regulates vehicle traffic.

As indicated in FIG. 8, the ad hoc adjacency vehicle network provided by the optical communication system 20 may be extended as part of a wide area network by the use of RSE such as using an LED pico cell that exchanges messages with at least the host vehicle. This may allow adjacent ad hoc networks to communicate between each other. Furthermore, with the use of cellular communication from the RSE (e.g., from the pico cell base station connecting to a cellular base station), the system may form adjacency subnets and may form the bottom layer of v2v and v2i communications with hierarchical dynamic cellular system.

Thus, it will be appreciated from the foregoing description that the disclosed line-of-sight optical communication system 20 enables a v2v network capable of supporting low latency message traffic between vehicles in close proximity to each other that could improve driving safety. The approach is agile enough to keep up with changes in vehicle positions and orientations, and can simultaneously meet low latency and high reliability constraints. Furthermore, the basic approach of this can be scaled to support large scale networks between large numbers of vehicles that would provide the exchange of information where latency is not as hard a constraint (ala 4G/5G cellular communication system). All this may be achieved without adding any significant additional components to the automobile.

Furthermore, the communication system 20 provides a network topology having many advantages:

- It may be incorporated into existing vehicle external lamp modules with minimal physical modifications and without requiring additional body panel apertures or environmental sealing.
- It is low power—it consumes no significant additional power than the exterior lighting system of a vehicle.
- There is little to no latency and there is virtually no network overhead.
- Transmitter-receiver complexity for each node is negligible and can be implemented using the circuits of FIG. 3 or 4.
- Nodes leave and enter the network very naturally—if another vehicle is in the immediate line of sight of the host vehicle, it belongs in its network, else it does not.
- Network complexity is inherently limited by the number of exterior lights in the vehicle—number of network nodes equals number of individual exterior lights—and is aided by lights is natural attenuation in free space.
- Network throughput can be scaled using digital modulation, and time- and wavelength-multiplexing.
- Well-established techniques from optics such as strobing, interference, polarization, filtering, grating, lensing, etc. can all be used individually or collectively to improve signal-to-noise ratio.
- Helps avoid collisions between adjacent vehicles, which are the vehicles most in danger of being collision threats to each other.
- At a minimum vehicle communicate can communicate critical safety information: speed, heading, orientation.
- Avoids many of the difficulties of typical network formation, such as network admission, route discovery, etc.
- LEDs do not have the same issues with jamming and interference associated with radio frequency techniques.
- LEDs do not have spectrum regulatory issues.
- Data communication speeds in the order of 10 Gbps can be achieved.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Further, the term "electrically connected" and the variations thereof is intended to encompass both wireless electrical connections and electrical connections made via one or more wires, cables, or conductors (wired connections). Other terms are to be construed using their broadest reasonable meaning unless they are used in a context that requires a different interpretation.

The invention claimed is:

1. A vehicle line-of-sight optical communication system for use in ad hoc networks formed with a vehicle during traveling of the vehicle along a roadway, comprising:
   a vehicle external lamp module, comprising:
      an electronic control unit (ECU) having an electronic processor that operates under control of a program to process messages sent or received by the communication system;
      at least one light source;
      a driver circuit electrically connected to the ECU to energize the light source(s) in response to a transmission signal from the ECU so as to send messages via the light source(s);
      at least one light sensor; and
      a receiver circuit electrically connected to the ECU to provide the ECU with a reception signal indicative of messages received via the light sensor(s), and
   a central controller that is in communication with the ECU via a vehicle communication bus and that is configured to receive adjacent vehicle messages from the vehicle external lamp module and one or more other vehicle external lamp modules, wherein each adjacent vehicle message specifies a position of an adjacent vehicle and is initially received at the vehicle external lamp module or the one or more other vehicle external lamp modules as an optical transmission signal that is modulated or otherwise encoded by the adjacent vehicle with vehicle data and that is transmitted from one or more light sources of the adjacent vehicle, and wherein the central controller is further configured to aggregate the received adjacent vehicle messages to form a sparse point cloud and to make a determination concerning a trajectory of the vehicle based on information derived from the sparse point cloud.

2. The vehicle line-of-sight optical communication system set forth in claim 1, wherein the vehicle external lamp module further includes a power input for receiving power from the vehicle.

3. The vehicle line-of-sight optical communication system set forth in claim 2, further comprising a housing, a cover lens attached to the housing, and additional light sources mounted with the at least one light source in the housing for shining light produced from the light sources through the cover lens.

4. The vehicle line-of-sight optical communication system set forth in claim 1, further comprising a vehicle bus interface electrically connected to the ECU and operable to control the sending and receipt of bus messages between the ECU and the vehicle communication bus.

5. The vehicle line-of-sight optical communication system set forth in claim 4, wherein the ECU and vehicle bus interface are integrated together into a single module or are physically separate modules electrically wired to each other.

6. The vehicle line-of-sight optical communication system set forth in claim 1, wherein the at least one light source and at least one light sensor together comprise a single light emitting diode (LED), with the driver circuit and receiver circuit both being electrically connected to the LED and forming with the LED an optical transceiver.

7. The vehicle line-of-sight optical communication system set forth in claim 1, wherein the at least one light source comprises at least one light emitting diode (LED), the at least one light sensor comprises at least one phototransistor, and the driver and receiver circuits comprise separate circuits electrically connected to the LED(s) and phototransistor(s), respectively.

8. The vehicle line-of-sight optical communication system set forth in claim 1, wherein the ECU comprises a processor, computer readable memory, and a program stored in the memory and accessible by the processor, wherein the processor is operable under control of the program to establish a node on an ad hoc network with other vehicles including the adjacent vehicle and to control the communicating of messages with the other vehicles using the light source(s) and light sensor(s).

9. The vehicle line-of-sight optical communication system set forth in claim 1, wherein the processor and memory are contained on a single integrated circuit.

10. The vehicle comprising the plurality of vehicle external lamp modules each of which includes an ECU, light source(s), driver circuit, light sensor(s), and receiver circuit of claim 1, and that together comprise the vehicle line-of-sight optical communication system.

11. A method of communicating over an ad hoc network from a vehicle traveling along a roadway, comprising the steps of:
    establishing communication from a vehicle with a plurality of other vehicles using line-of-sight optical signals, wherein the line-of-sight optical signals are sent and received via one or more external lamp modules on the vehicle that provide visual signaling and/or illumination external to the vehicle;
    obtaining a plurality of adjacent vehicle messages based on the received line-of-sight optical signals, wherein each adjacent vehicle message specifies a position of an adjacent vehicle and is initially received at the one or more external lamp modules as an optical transmission signal that is modulated or otherwise encoded by the adjacent vehicle with vehicle data and that is transmitted from one or more light sources of the adjacent vehicle;
    aggregating the plurality of adjacent vehicle messages to form a sparse point cloud;
    determining a change in trajectory of the vehicle based on information derived from the sparse point cloud; and
    transmitting messages using the line-of-sight optical signals between the vehicle and other vehicles including the adjacent vehicle.

\* \* \* \* \*